United States Patent Office 3,022,280
Patented Feb. 20, 1962

3,022,280
PROCESS OF MAKING VINYL ETHER POLYMERS
Julius G. Shukys, Chatham Township, N.J., assignor to Air Reduction Company, Incorporated, New York, N.Y., a corporation of New York
No Drawing. Filed May 9, 1958, Ser. No. 734,129
2 Claims. (Cl. 260—91.1)

This invention relates to polymers of vinyl lower-alkyl ethers and to a process for producing them and it is more particularly concerned with a process for making high molecular weight amorphous poly(vinyl lower alkyl ethers), especially poly(vinyl methyl ethers), which have valuable properties.

The polymerization of vinyl alkyl ethers has been heretofore proposed and various processes have been described. Typical processes have, for example, been disclosed in U.S. 2,104,000 and U.S. 2,104,002 wherein polymerization is effected in the presence of acid-reacting catalysts at various temperatures. The products obtained by these prior processes are for the most part brown viscous, liquid or soft-solid products, generally described as "balsam-like." In any case, they are of relatively low molecular weight. Efforts to produce more valuable products have continued and products have been described which have a higher molecular weight and are further removed from the liquid or soft-solid state. These improved products, however, have only moderately good physical properties and their molecular weights are far below those which are obtained in polymers of other types of monomers, such as styrene.

There has, accordingly, been a continuing search for vinyl alkyl polymers of truly high molecular weight and particularly for polymers which exhibit valuable related properties such as high intrinsic viscosity. Varying success has been had with the several members of the vinyl alkyl ether family but particular difficulty has been experienced when working with vinyl methyl ether which has been found to have the least activity of all and to exhibit limited response to the usual polymerization processes. Various catalysts have been proposed but heretofore used catalysts have produced relatively low molecular weight polymers, particularly when vinyl methyl ether is used as the monomer. Furthermore, very low temperatures have generally been necessary for controlled polymerization initiated by prior catalysts, and attempts to operate at temperatures in the vicinity of 0° C. or room temperature have been difficult to control due to the exothermic nature of the reaction.

It is an object of the present invention to provide new amorphous polymers of vinyl lower alkyl ethers which have high molecular weights and valuable physical properties, more particularly amorphous vinyl methyl ether polymers which have these characteristics.

It is another object of the invention to provide a process for producing amorphous vinyl lower alkyl ether polymers of the character indicated which is particularly suitable for the polymerization of vinyl methyl ether.

It is a further object of the invention to provide a new catalyst for polymerizing vinyl lower alkyl ethers which is of particular utility in forming high molecular weight amorphous polymers from vinyl methyl ether and makes possible a smooth, controlled reaction without need for very low temperatures.

The amorphous, high molecular weight polymers of this invention are suitably prepared by polymerizing a vinyl lower alkyl ether, more specifically vinyl methyl ether ($CH_2=CH-O-CH_3$), at a temperature of $-20°$ C. to 20° C., preferably about 0° C., using a catalyst consisting of zinc chloride and tertiary-butyl chloride. The upper temperature is selected in accordance with the normal boiling point of the vinyl lower alkyl ether employed. Thus, when vinyl methyl ether is polymerized, a temperature up to 6° C. is suitably employed. Polymerization is effectively carried out without the use of solvents and the reaction is thus one of "bulk polymerization." An inert solvent such as propane may, however, be employed if desired. Continuous stirring is advantageously provided during the polymerization period in order to provide optimum contact between the two-part catalyst and the monomer. It is to be noted that both zinc chloride and tertiary butyl chloride must be present in the reaction mixture since either compound alone is not effective.

All of the components of the reaction mixture are initially mixed together and are then allowed to stand at $-20°$ C. to 20° C. with or without agitation for 1 to 48 hours. Polymerization is readily carried out at atmospheric pressure, and there is no need for the application of super-atmospheric or sub-atmospheric pressures although such pressures may be used if desired, particularly if the boiling point of any solvent should make it advantageous.

The vinyl alkyl ether monomer, more particularly vinyl methyl ether monomer, which is employed in accordance with this invention is suitably one which is substantially free from the contaminants normally present in the commercial forms of the ethers. Commercial vinyl alkyl ethers are commonly produced by the reaction of acetylene upon the appropriate alcohol and commercial vinyl methyl ether, for example, normally contains a total of about 5% of contaminants consisting of methanol, water, acetaldehyde, acetylene, and possibly dimethyl acetal. It is desirable to reduce to a minimum the quantities of the contaminants present, particularly the alcohol, e.g. methanol and acetaldehyde, and preferably the water and acetylene are also substantially removed. For this purpose the commercial monomer is suitably treated by refluxing it over solid potassium hydroxide for about 16 hours, followed by refluxing over metallic sodium for about 16 hours. When the alcohol has been eliminated, the surface of fresh metallic sodium added to the refluxing ether remains shiny and there is thus provided a rapid test for determining the absence of alcohol from the ether. The ether is separated from the potassium hydroxide by simple distillation and, following the treatment over metallic sodium, the ether is distilled through a fractionating column until the distillate gives a negative test for acetylene (Ilosvay's reagent) and acetaldehyde (Tollen's reagent).

In some cases, however, it is sufficient to wash the monomer with water thoroughly to remove the methanol or other alcohol, followed by drying over KOH and distillation to recover the monomer, although best results are obtained with a monomer which has been subjected to the previously-described treatment.

The ratio between the zinc chloride and the tertiary butyl chloride may be varied to a considerable extent but preferably about 0.8 part by weight of the tertiary butyl chloride per part of zinc chloride are employed. In general, 0.2 to 10 parts by weight of tertiary butyl chloride per part of zinc chloride are advantageously used. For best results, the zinc chloride is employed in crushed form. The use of crushed zinc chloride tends to reduce the time required for polymerization.

The polymerization reaction is conveniently carried out in any conventional apparatus used for reactions in the vicinity of 0° C. When operating on a small scale, for example, a particularly suitable reaction vessel is a three-necked flask fitted with a "Dry-Ice"-acetone condenser or "cold-finger" and immersed in an ice bath or a bath containing solid carbon dioxide "Dry-Ice," and suitably provided with a thermometer. Other convenient means may be employed to reach and maintain the specified reaction temperature. Corresponding large-scale units are readily employed when desired and the process of the invention is in no way limited by a particular reaction apparatus or cooling means.

Upon completion of polymerization, the catalyst is deactivated or "quenched" prior to separation of the polymer. The quenching of acid-reacting catalysts is a well-known procedure and is suitably effected by treating the polymerization mass with a mixture of equal amounts of methanol and ammonium hydroxide containing a small amount, e.g. 1%, of thymol or other oxidation inhibitor. Instead of ammonium hydroxide, other alkaline reagents such as anhydrous ammonia, sodium hydroxide, potassium hydroxide or organic amines such as methylamine, ethanolamine, pyridine, and the like may be used, and instead of methanol, other alcohols such as ethanol and butanol and the like may be employed. There are advantageously employed .05 to 1 volume of the quenching mixture for each volume of the polymerization mass.

After deactivation or "quenching" of the catalyst, the polymer is recovered by adding alcohol, such as methanol in which the polymer is soluble to dissolve the polymer and then adding water to the resulting solution in an amount corresponding to 5 to 10 times the amount of alcohol. Upon heating to 35–40° C., the polymer precipitates from the alcohol-water mixture and is readily recovered by decantation. The precipitation is then repeated by again dissolving the polymer in an alcohol, e.g. methanol, containing an alkaline reagent such as ammonium hydroxide and then adding 5 to 10 volumes of water and heating. Dissolution of the polymer and reprecipitation may be repeated a second time if desired. Finally the polymer is dried under vacuum in a low temperature oven, e.g. at 30 to 50° C. to constant weight.

The polymers produced in accordance with this invention are characterized by a molecular weight of at least 40,000, preferably 40,000 to 330,000, and an intrinsic viscosity of at least .2 deciliter per gram (dl./g.), preferably 1 to 1.3 dl./g. The several properties of the polymers referred to above are readily determined in suitable manner by conventional methods. Thus, molecular weight is suitably determined by the well-known light-scattering method described, for example, on pages 283–303 of "Principles of Polymer Chemistry" by Paul J. Flory (Cornell University Press—1953), and intrinsic viscosity is similarly determined by conventional techniques in accordance with the procedure described on pages 309–314 of Flory's "Principles of Polymer Chemistry" identified above, using an Ubbelohde (suspended level) Viscometer for methyl ethyl ketone solutions at 30° C.

We have found that the relationship which exists between intrinsic viscosity and molecular weight may be expressed by the following formula $[\eta] = 1.1 \times 10^{-3} M^{0.56}$, wherein $[\eta]$ is the intrinsic viscosity in deciliters per gram and M is the molecular weight. It is possible by means of this formula to determine molecular weight with accuracy once the intrinsic viscosity value is known.

The amorphous poly(vinyl alkyl ethers), more particularly poly(vinyl methyl ether), obtainable in accordance with the above-described process are novel compositions of matter characterized not only by the high molecular weight, and the other valuable properties heretofore denied, but they are also characterized by the fact that they are clear and colorless, and have long-lasting stability to light and heat. They have improved form stability and they can be cross-linked by treatment with benzoyl peroxide. Such cross-linking has the effect of rendering the polymer thermosetting and insoluble in common solvents. They are generally soluble in organic solvents such as benzene, chlorobenzene, diethylether, acetone, ethanol and with respect to water they are generally insoluble except that the methyl vinyl ether polymer is soluble in water below 35° C.

A particularly important and valuable use for the high-molecular weight polymers of this invention is as the fuel component of solid rocket propellants, wherein they are admixed with an oxidizer such as sodium nitrate, ammonium perchlorate, and the like known solid propellant oxidizers. Thus, in a typical solid rocket propellant having a high specific impulse, e.g. a specific impulse of 240 pounds per second per pound, a high molecular weight amorphous polymer having the characteristics above described is combined with the oxidizer in the proportions of 20% by weight of polymer and 80% by weight of oxidizer. The polymer may be used as the sole fuel component of the propellant or it may be combined with the high molecular weight crystalline poly(vinyl alkyl ethers) described in the copending application of Gordon J. Arquette and Julius G. Shukys, Serial No. 734,229, entitled Vinyl Ether Polymers and Process of Making Same and filed on even date herewith. A mixture of the amorphous polymer of this invention, e.g. 90%, with a crystalline polymer produced by the process described in said co-pending application, e.g. 10% has been found to be particularly suitable. The polymers of vinyl methyl ether are particularly effective for this rocket propellant use.

The following specific examples are further illustrative of the invention it being understood that these examples are given by way of illustration only and are not to be considered as limitative of the invention. Unless otherwise specified, all parts are by weight and the vinyl lower alkyl ether monomer employed was purified by refluxing over solid potassium hydroxide followed by refluxing over metallic sodium for 16 hours.

*Example 1*

Into a flask provided with a Dry-Ice condenser, and maintained at substantially −15° C. by means of a refrigerated air bath there were charged 105 parts of vinyl methyl ether, 0.2 part of crushed zinc chloride and 1.7 part of tertiary butyl chloride. After 48 hours the reaction mixture was quenched and the polymer recovered. Quenching was effected by adding a mixture of equal parts of methanol and ammonium hydroxide containing 1% thymol, the quenching mixture being used in the quantity of 0.3 volume per volume of polymerization mass. There were then added 0.7 volume of methanol and the mixture was stirred to dissolve the polymer. The polymer was then precipitated by adding 10 volumes of cold water and heating to 40° C. The poly(vinyl methyl ether) was separated by decantation and was then redissolved in 1 volume of methanol. Upon the addition of 10 volumes of water, and heating to 40° C. re-precipitation of the polymer was effected. Following separation by decantation, the polymer was dried under vacuum to constant weight in an oven at 40° C.

There was thus recovered an amorphous poly(vinyl methyl ether) in almost quantitative yield which was clear and colorless and highly resistant to discoloration upon exposure to heat and light. It had an intrinsic viscosity (dl./gm.) of substantially 0.5 and a corresponding molecular weight of about 60,000.

*Example 2*

The procedure of Example 1 was repeated except that 455 parts of vinyl methyl ether, 6.4 parts of zinc chloride, and 2.5 parts of tertiary butyl chloride were employed. The recovered poly(vinyl methyl ether) was a clear, colorless material having an intrinsic viscosity (dl./gm.) of 0.6 and a molecular weight of about 100,000.

*Example 3*

To demonstrate the necessity of the combination of tertiary butyl chloride with the zinc chloride in the polymerization of vinyl methyl ether there was prepared in a flask such as used in Example 1 a reaction mixture consisting of 105 parts of vinyl methyl ether and 1 part of crushed zinc chloride, the tertiary butyl chloride being omitted. The mixture was allowed to stand for one week but at the end of this time no polymer had been formed. There were then added 1 part of tertiary butyl chloride. Visible reaction began immediately and after 8 hours there was recovered, using the procedure of Example 1, a poly(vinyl methyl ether) which was a clear, colorless product having a specific viscosity (dl./gm.) substantially of .8 and a molecular weight of 150,000.

*Example 4*

In order to show the beneficial effects of stirring during the course of the reaction, the procedure of Example 2 was repeated with continuous stirring. Polymerization was found to be complete in 6½ hours. The poly(vinyl methyl ether) recovered was clear and colorless and had an intrinsic viscosity (dl./gm.) of substantially 0.5 and a molecular weight of 60,000.

In the foregoing examples, the polymerization of vinyl methyl ether has been described in detail and, as previously indicated, the process of this invention is of particular value for the polymerization of this monomer and makes possible the production of new poly(vinyl methyl ethers) which have new properties. However, the process is also applicable to the polymerization of other vinyl lower alkyl ethers, e.g. vinyl ethers having alkyl groups containing up to four carbon atoms, such as ethyl, propyl and butyl. The following examples show the application of our process to a representative member of these other vinyl lower alkyl esters.

*Example 5*

Into a polymerization flask provided with a water condenser there were introduced 160 parts of vinyl ethyl ether, the flask being packed in ice to provide a temperature of substantially 0° C. There were then introduced 1.7 parts of tertiary butyl chloride and 2 parts of zinc chloride. Reaction started almost immediately and was complete in 5 hours. The temperature rose to 4° C. during the reaction. After quenching and separating the polymer by evaporating the solvent, there was obtained a clear, colorless poly(vinyl ethyl ether) having an intrinsic viscosity (dl./gm.) of 0.35.

*Example 6*

The procedure of Example 5 was repeated except that the reagents, although used in the same proportions, were treated at room temperature and 0.31 part of the stabilizer butylated hydroxy anisole was added per 100 parts of monomer and no stabilizer was added to the quenching mixture. After the reaction was completed, the clear, colorless poly(vinyl ethyl ether) which was recovered was found to have an intrinsic viscosity of 0.28 dl./gm.

The amorphous polyvinyl methyl ether which is obtained in accordance with our above-described process, as shown in the foregoing examples, is, as previously mentioned, particularly suitable as the fuel component of a solid rocket propellant. Thus when the polymer of Example 4, for instance, is combined with ammonium perchlorate or other like solid oxidizer in the proportions of 70 to 90% by weight of oxidizer to about 30 to 10% by weight of the polymer, e.g. 80% by weight of ammonium perchlorate and 20% by weight of amorphous poly(vinyl methyl ether), there is provided a particularly effective solid rocket propellant having a high specific impulse, e.g. about 240 pounds per second per pound, which is defined as the amount of thrust in pounds that can be obtained from each pound of propellant consumed per second.

It will be understood that various changes and modifications may be made in the subject matter described above without departing from the invention as defined in the appended claims, and it is intended, therefore, that all matter contained in the foregoing description shall be interpreted as illustrative only and not as limitative of the invention.

I claim:

1. A process of making high molecular weight polymers of a vinyl lower alkyl ether in which the lower alkyl radical contains 1 to 4 carbon atoms which comprises polymerizing said ether in admixture with a small but effective amount of a catalyst consisting essentially of zinc chloride and tertiary butyl chloride, the tertiary butyl chloride being present in the proportion of 0.2 to 10 parts by weight per part of zinc chloride.

2. A process of making high molecular weight polymers of a vinyl lower alkyl ether in which the lower alkyl radical contains 1 to 4 carbon atoms which comprises polymerizing said ether at a temperature of −20° to 20° C. in admixture with a small but effective amount of a catalyst consisting essentially of zinc chloride and tertiary butyl chloride, the tertiary butyl chloride being present in the proportion of 0.2 to 10 parts by weight per part of zinc chloride.

References Cited in the file of this patent

UNITED STATES PATENTS 2,447,139 Schmerling _____ Aug. 17, 1948
2,555,179 Zoss _____ May 29, 1951

OTHER REFERENCES

Schildknecht et al.; "Ind. & Eng. Chem.", 41, No. 9, pp. 1998–2003, September 1949.